United States Patent

Pashtan et al.

[19]

[11] Patent Number: 6,138,018
[45] Date of Patent: Oct. 24, 2000

[54] METHOD FOR CONTROLLING A CELL-REGISTRATION FEATURE OF A MOBILE IN A WIRELESS COMMUNICATION SYSTEM

[75] Inventors: Ariel Pashtan; Israel A. Cimet, both of Buffalo Grove, Ill.

[73] Assignee: Motorola, Inc., Schaumburg, Ill.

[21] Appl. No.: 08/993,937

[22] Filed: Dec. 18, 1997

Related U.S. Application Data

[62] Division of application No. 08/685,301, Jul. 23, 1996, Pat. No. 5,842,127.
[60] Provisional application No. 60/001,685, Jul. 31, 1995.
[51] Int. Cl.[7] ............................................. H04Q 7/20
[52] U.S. Cl. .......................... 455/435; 455/433; 455/432
[58] Field of Search ............................. 455/435, 432, 455/436, 458, 426, 446, 517, 422, 424

[56] References Cited

U.S. PATENT DOCUMENTS

| | | | |
|---|---|---|---|
| 4,700,374 | 10/1987 | Bini | 455/458 |
| 4,876,738 | 10/1989 | Selby | 455/435 |
| 5,054,110 | 10/1991 | Comroe et al. | 455/435 |
| 5,212,822 | 5/1993 | Fukumine et al. | 455/561 |
| 5,361,396 | 11/1994 | Onoe et al. | 455/435 |
| 5,710,972 | 1/1998 | Lin | 455/525 |
| 5,748,620 | 5/1998 | Capurka | 370/328 |
| 5,842,127 | 11/1998 | Pashtan et al. | 455/435 |

*Primary Examiner*—Fan Tsang
*Assistant Examiner*—Sheila B. Smith
*Attorney, Agent, or Firm*—Wayne J. Egan; Jeffrey K. Jacobs

[57] ABSTRACT

A wireless communication system includes switching infrastructure (150) and at least one location area ("LA") having a multiplicity of cells (the "multiple-cell LA") (103). When a mobile (100) enters a cell belonging to the multiple-cell LA, the mobile is arranged with a cell-registration feature that enables it to register with the serving cell site, thus forming a registration with the cell site. When the mobile enters a further cell belonging to the multiple-cell LA, the mobile registers with the corresponding further cell site, thus forming a registration with the further cell site. When the switching infrastructure receives a call attempt towards the mobile, the switching infrastructure pages the mobile in only those cells in which a cell registration exists for the mobile.

7 Claims, 3 Drawing Sheets

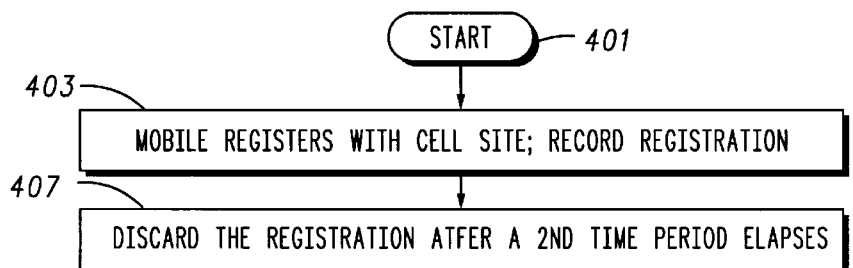
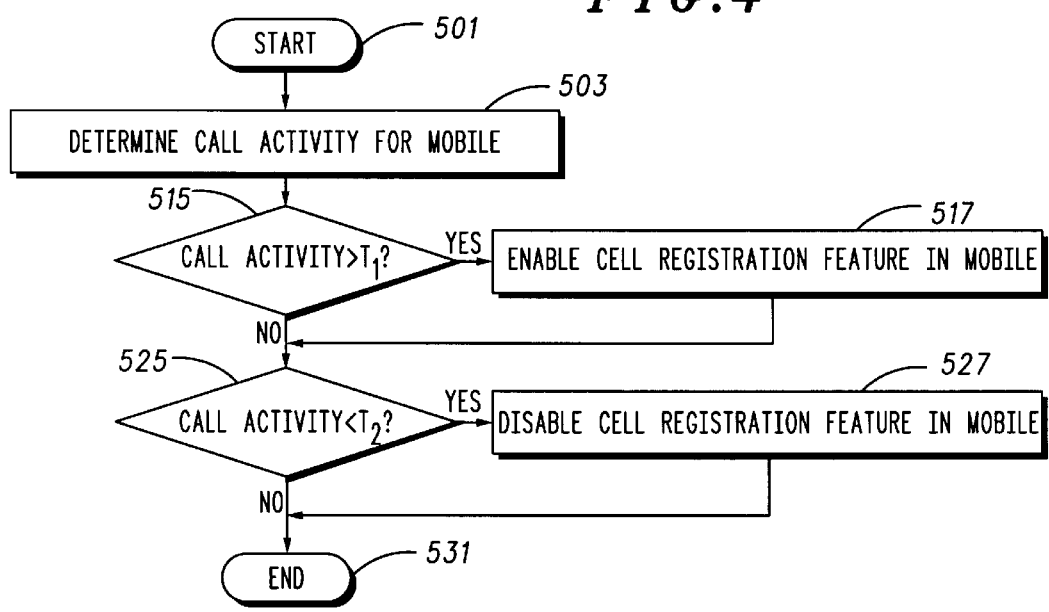
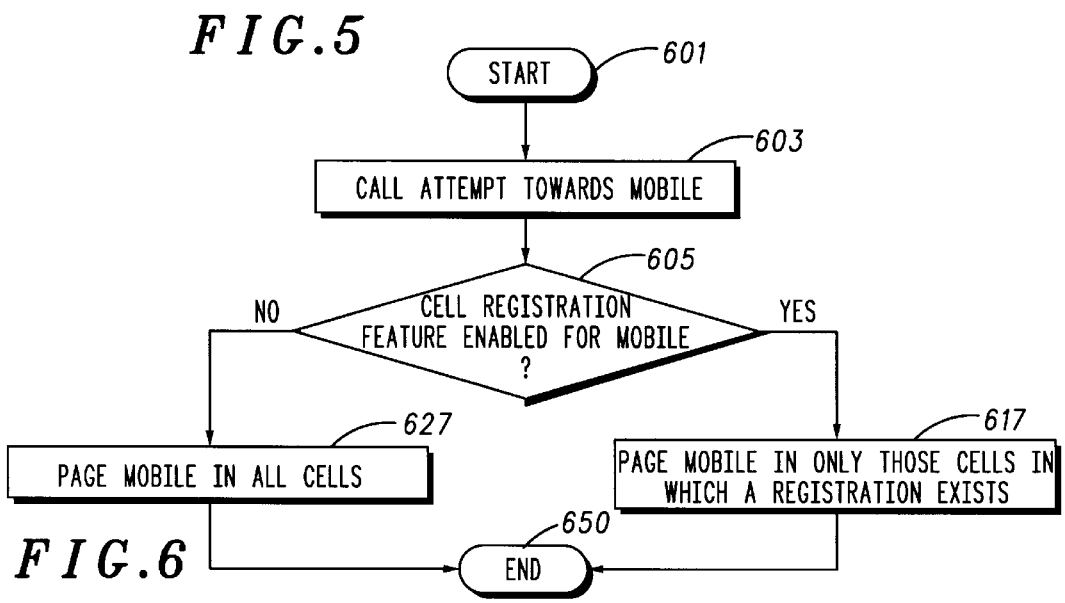

METHOD FOR CONTROLLING A CELL-REGISTRATION FEATURE OF A MOBILE IN A WIRELESS COMMUNICATION SYSTEM

REFERENCE TO PRIOR PROVISIONAL APPLICATION

This APPLN claims benefit of Provisional APPLN No. 60/001,685 filed Jul. 31, 1995.

The present application is a divisional on prior U.S. application Ser. No. 08/685,301, filed on Jul. 23, 1996, now U.S. Pat. No. 5,842,127; which is hereby incorporated by reference, and priority thereto for common subject matter is hereby claimed. The applicant hereby claims the priority benefit of prior provisional application Ser. No. 60/001,685, filed Jul. 31, 1995, by Ariel Pashtan and Israel A. Cimet, which prior provisional application is hereby incorporated by reference verbatim, with the same effect as though the prior provisional application were fully and completely set forth herein.

FIELD OF THE INVENTION

This application relates to wireless communication systems including, but not limited to, a method for a mobile to register with one or more cell sites and a method for paging the mobile.

BACKGROUND OF THE INVENTION

It is known that modern wireless communication systems, such as digital cellular systems, including Global System for Mobile Communication (hereinafter "GSM"), utilize mobility management and call processing procedures.

It is also known that radio frequencies are a scarce resource for radio communication, and new methods to improve the efficiency of its use are constantly sought. A typical wireless system keeps track of the location of a mobile by creating different geographical areas called "location areas". The term "location area" is hereinafter alternately referred to as "LA." A mobile that moves between two location areas sends a message called a "location update" to inform the system of its new location.

When a mobile enters a new location area, it performs a location update procedure, that is, it informs the wireless communication system's switching infrastructure of its new LA. This procedure is referred to as a SWITCH LOCATION UPDATE (hereinafter "SLU").

A typical location area will consist of one or more cells, each cell comprising the coverage area of its corresponding serving cell site. Using existing technology, when a mobile is paged, all cells in the current LA are paged, even though the mobile is just in one cell, thus resulting in significant RF bandwidth being wasted. Decreasing the LA geographical sizes will not improve the problem, since now the mobile has to register more often thus incurring both an RF utilization increase as well as an additional overhead on the signaling required in the infrastructure.

As a result, there is a need for a new location update procedure for mobiles in wireless communication systems.

BRIEF DESCRIPTION OF THE DRAWINGS

FIG. 4 is a flow diagram used by a cell site to register the mobile.

FIG. 5 is a flow diagram used by the switching infrastructure to control the cell-registration feature in the mobile.

FIG. 6 is a flow diagram used by the switching infrastructure to page the mobile.

DESCRIPTION OF THE PREFERRED EMBODIMENT

Figure 1:
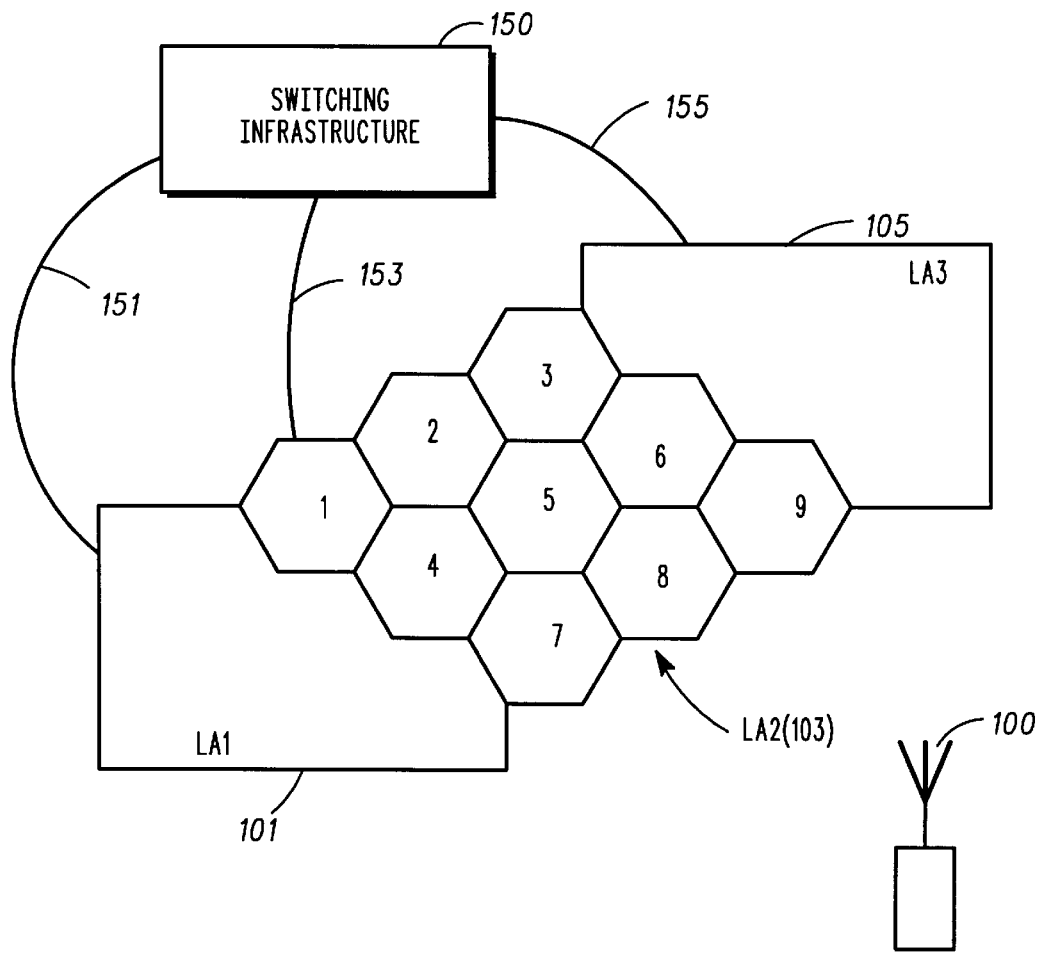
FIG. 1 is a block diagram of a wireless communication system that is useful for demonstrating a method for a mobile to register with one or more cell sites and a method for paging the mobile, in accordance with the present invention. As shown, the wireless communication system includes switching infrastructure 150, a mobile 100, and at least one LA 103 having a multiplicity of cells (the "multiple-cell LA"). As explained below, the mobile includes a cell-registration feature that enables it to register with one or more cell sites of the multiple-cell LA.

Briefly, the present invention generally is directed to a wireless communication system that includes switching infrastructure, at least one mobile, and at least one location area having a multiplicity of cells, hereinafter referred to as the "multiple-cell LA." In particular, the present invention is directed to a method for the mobile to register with one or more cells as it travels through the multiple-cell LA. The invention further includes a method for the switching infrastructure of the wireless communication system to page the mobile within the multiple-cell LA.

In one aspect of the invention, when the mobile enters a cell belonging to the multiple-cell LA, the mobile is arranged with a cell-registration feature that enables it to register with the serving cell site, thus forming a mobile registration with the cell site. When the mobile enters a further cell belonging to the multiple-cell LA, the mobile registers with the corresponding further cell site, thus forming a mobile registration with the corresponding further cell site. Moreover, when the switching infrastructure receives a call attempt towards the mobile, the switching infrastructure pages the mobile in only those cells in which a registration exists for the mobile.

In a further aspect of the invention, when the mobile has remained within the cell for a first time period, it re-registers with the serving cell site, thus re-forming a mobile registration with the cell site. Likewise, each cell site in which a registration exists for the mobile discards the mobile registration after a second time period. In one embodiment, the first time period and the second time period are each based on the average time the mobile requires to traverse a typical cell, with the two time periods being approximately equal.

In a still further aspect of the invention, the mobile contains a list of recently-visited cells. Upon entering a cell, when the mobile determines that the cell is NOT on the list of recently-visited cells, it registers with the serving cell site and adds the cell to the list of recently-visited cells. Conversely, when the mobile determines that the cell IS on the list of recently-visited cells, it does NOT register with the serving cell site, and does NOT add the cell to the list of recently-visited cells.

In another aspect of the invention, the mobile includes a call activity that varies with time, and the mobile's cell-registration feature may be selectively enabled by the switching infrastructure based on the call activity for the mobile. When the call activity for the mobile exceeds a first threshold, the switching infrastructure enables the cell-registration feature in the mobile. Conversely, when the call activity for the mobile is less than a second threshold, the switching infrastructure disables the cell-registration feature in the mobile.

In still another aspect of the invention, when the switching infrastructure receives a call attempt towards the mobile and the cell-registration feature is enabled for the mobile, the switching infrastructure pages the mobile in only those cells in which a registration exists for the mobile; otherwise, when the cell-registration feature is not enabled for the mobile, the switching infrastructure pages the mobile in the multiplicity of cells.

Referring now to FIG. 1, there is shown a wireless communication system including switching infrastructure 150 and including one or more location areas 101, 103, 105, with each location area being designated "LA." The LA's 101, 103 and 105 are alternately designated as LA1, LA2, and LA3, respectively. As shown, the wireless communication system includes at least one LA, namely LA2, that includes a multiplicity of cell sites (the "multiple-cell LA"). Also shown is a typical mobile 100 that, as explained below, is arranged with a cell-registration feature that enables it to register with one or more cell sites. Further, the mobile includes a call activity that varies with time. As shown, the multiple-cell LA 103 includes 9 cells respectively designated 1–9. Further, each cell 1–9 includes a corresponding serving cell site, as discussed with FIG. 2 below.

As shown, the switching infrastructure 150 is linked to the LA1, LA2, and LA3 respectively by links 151, 153 and 155. Although the wireless communication system is depicted in FIG. 1 as containing three LA's 101, 103 and 105, the invention is equally applicable to wireless communication systems having any number of LA's, provided that at least one LA includes a multiplicity of cells.

In a first embodiment, the wireless communication system of FIG. 1 is a GSM system.

In a second embodiment, the wireless communication system of FIG. 1 is an Integrated Dispatch Enhanced Network ("iDEN") system.

In a third embodiment, the wireless communication system of FIG. 1 is a United States Digital Cellular ("USDC") system.

Moreover, in still other embodiments, the present invention may be applied to any wireless communication system that includes at least one multiple-cell location area.

Figure 2:
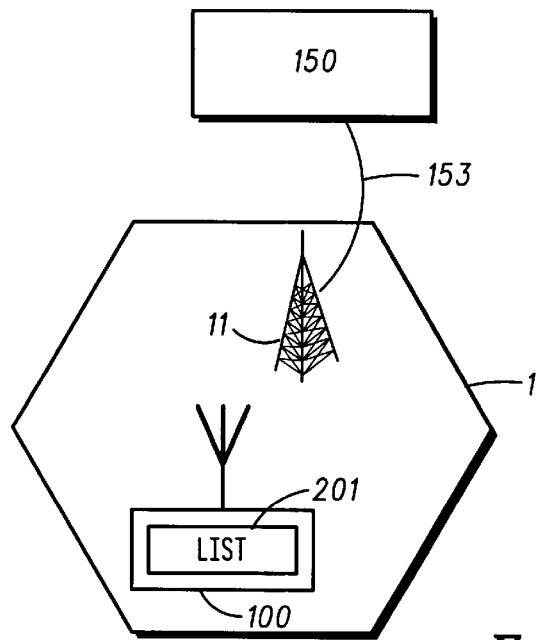
FIG. 2 is a block diagram of a typical cell 1 of the wireless communication system, the cell including a serving cell site 11.

Referring now to FIG. 2, there is shown a block diagram of a typical cell 1 of the wireless communication system, the cell including its corresponding serving cell site 11. In this view, the mobile 100 is depicted as being located within cell 1. As shown, the cell site 11 is coupled to the switching infrastructure 150 by means of the link 153. Also as shown, the mobile 100 contains a list 201 of recently-visited cells.

Returning momentarily to FIG. 1, suppose the mobile 100 travels from LA1 to LA2 to LA3 and, while in LA2, further suppose the mobile consecutively travels through multiple cells. In accordance with the present invention, the mobile is arranged with a cell-registration feature that enables it to register with each cell site in its path as it travels through LA2.

Figure 3:
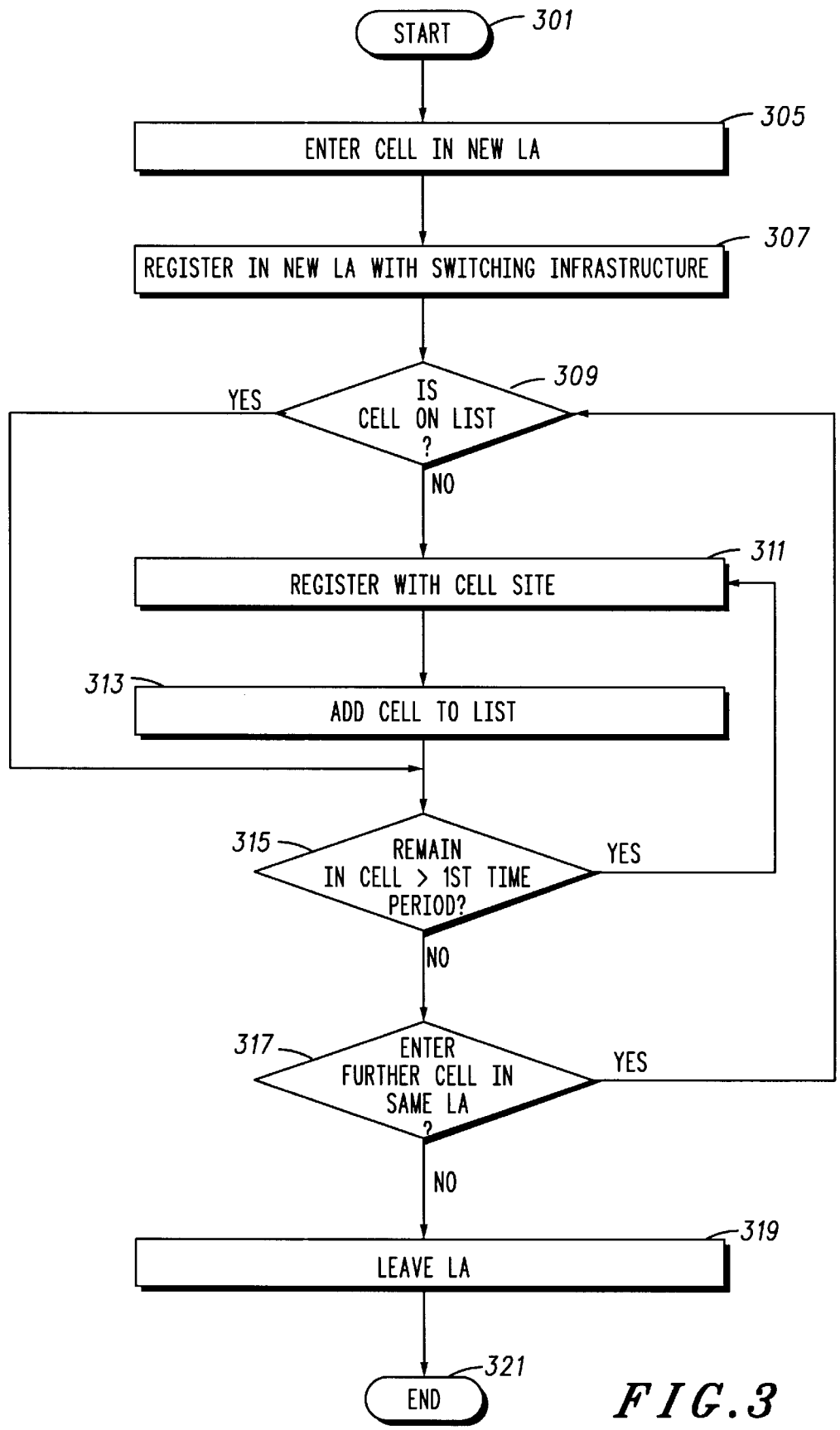
FIG. 3 is a flow diagram used by a mobile to register with one or more cell sites.

Referring now to FIG. 3, there is shown a flow diagram used by the mobile to register with one or more cell sites in its journey through LA2.

The process begins at step 301. In step 305, after leaving the (old) LA1, the mobile enters a cell in the (new) LA2. This step 305 is equivalent to the mobile entering a cell belonging to the multiple-cell LA2. In step 307, the mobile performs a SLU; that is, the mobile registers in the new LA2 with the switching infrastructure 150.

In step 309, the mobile determines whether the cell is on the list of recently-visited cells. If the determination to this step 309 is negative, the mobile proceeds to step 311; otherwise, if the determination to this step 309 is positive, the mobile proceeds to step 315.

When the mobile determines in step 309 that the cell site is NOT on the list of recently-visited cell sites, the process goes to step 311, where the mobile registers with the corresponding cell site, thus forming a registration for the mobile with the corresponding cell site. In step 313, the mobile adds the cell site to the list of recently-visited cell sites. The process then goes to step 315.

As mentioned above, when the mobile determines in step 309 that the cell IS on the list of recently-visited cells, the process OMITS (that is, does NOT perform) step 311 (registering with cell site) and step 313 (adding the cell to list), and goes DIRECTLY to step 315.

In step 315, the process determines when the mobile has remained within the cell for a first time period. When the mobile determines that it has remained within the cell for the first time period, the determination from step 315 will be positive, and the process returns to step 311, where it re-registers with the corresponding cell site, thus re-forming a registration for the mobile with the corresponding cell site. Otherwise, the process proceeds to step 317.

In step 317, the process determines when the mobile has entered a further cell belonging to the same LA, that is, the multiple-cell LA2.

When the determination from step 317 is positive (that is, the mobile has entered a further cell in the same LA), the process returns to step 309. In step 309, assuming the further cell is NOT on the list of recently-visited cells, then the determination from step 309 will be negative, and the process will proceed to step 311, where the mobile registers with the corresponding further cell site, thus forming a registration for the mobile with the corresponding further cell site.

Ultimately, when the mobile does NOT remain in the cell for a first time period AND when the mobile does NOT enter a further cell in the same LA, then the determination of steps 315 and 317 respectively will BOTH be negative, and the mobile will leave the LA, step 319. The process will then end, step 321.

Referring now to FIG. 4, there is shown a flow diagram used by each cell site in the multiple-cell LA2 to register the mobile.

The process starts, step 401. In step 403, when the mobile registers with the cell site, the cell site records the registration for the mobile.

In step 407, the cell site discards the registration after a second time period elapses. Thus, each cell site in which a registration exists for a given mobile will discard the registration after the expiration of the second time period. The process then ends, step 409.

The first time period and the second time period are both operator defined. In one embodiment, the first time period is based on the average time the mobile requires to traverse a typical cell; as well, the second time period is based on the average time the mobile requires to traverse a typical cell. Also, typically the first time period is less than the second time period.

The cell-registration feature thus allows the mobile 100 to form a registration with each cell that it visits as it travels through the multiplicity of cells comprising LA2. Further, in accordance with the present invention, the mobile's cell-registration feature may be selectively enabled by the switching infrastructure 150 based on the call activity of the mobile, wherein the call activity of the mobile varies with time. It will be appreciated that the call activity corresponds to the rate of mobile-terminated call attempts.

Referring now to FIG. 5, there is shown a flow diagram used by the switching infrastructure 150 to control the cell-registration feature in the mobile based on the call activity of the mobile.

The process starts, step 501.

In step 503, the process determines the call activity for the mobile.

In step 515, the process determines when the call activity for the mobile exceeds a first threshold. It will be appreciated that the first threshold corresponds to a relatively high rate of attempts to terminate calls in the mobile 100.

When the process determines that the call activity for the mobile exceeds the first threshold, then the process goes to step 517, where it enables the cell-registration feature in the mobile. The process then goes to step 525.

In step 525, the process determines when the call activity for the mobile is less than a second threshold. It will be appreciated that the second threshold corresponds to a relatively low rate of attempts to terminate calls in the mobile 100.

When the process determines that the call activity for the mobile is less than the second threshold, then the process goes to step 527, where it disables the cell-registration feature in the mobile.

The process then ends, step 531.

The first (high) threshold and the second (low) threshold are both operator defined. In one embodiment, the first threshold is greater than the second threshold. In an alternate embodiment, the first threshold is approximately equal to the second threshold.

Referring again to step 515, it will be appreciated that substantially equivalent results would be achieved if step 515 determined when the call activity for the mobile exceeds OR EQUALS the first threshold.

Also, referring again to step 525, it will be appreciated that substantially equivalent results would be achieved if step 525 determined when the call activity for the mobile is less than OR EQUALS the second threshold.

By controlling the cell-registration feature in the mobile based on the mobile's call activity, the operation of the mobile cell-registration feature is advantageously improved by minimizing the radio frequency ("RF") overhead required to register the mobile with the cell site. As a result, only mobiles having a relatively high rate of attempted mobile-terminated calls and corresponding high rate of wireless communication system paging will incur a cell registration RF overhead.

Referring now to FIG. 6, there is shown a flow diagram used by the switching infrastructure 150 to page the mobile 100 as it travels in the multiple-cell LA2. It will be recalled (with momentary reference to the discussion of FIGS. 3–4 above) that the mobile 100 includes a cell-registration feature that allows the mobile to form a registration with each cell that it visits as it travels through LA2. It will also be recalled (with momentary reference to the discussion of FIG. 5 above) that the cell-registration feature of the mobile may be selectively enabled by the switching infrastructure 150.

The process starts, step 601.

Upon receiving a call attempt towards the mobile by the switching infrastructure, step 603, the process goes to step 605. In step 605, the switching infrastructure determines when the cell-registration feature is enabled for the mobile.

When step 605 determines that the cell-registration feature IS enabled for the mobile, the process goes to step 617. In step 617, the switching infrastructure pages the mobile in ONLY those cells in which a registration exists for the mobile. The process then ends, step 650.

Conversely, when step 605 determines that the cell-registration feature is NOT enabled for the mobile, the process goes to step 672. In step 627, the switching infrastructure pages the mobile in ALL cells throughout LA2, that is, in the multiplicity of cells comprising LA2. The process then ends, step 650.

In practice, the cell-registration process can be viewed in terms of the mobile 100 performing a new CELL LOCATION UPDATE ("CLU") procedure by registering in the visited cells of its current location area. Thereafter, when paged in the location area, only the visited cells will be paged.

Again, with reference to FIG. 1, suppose the mobile enters LA2 in cell 1, and sequentially traverses cell 2 and cell 3 in its path across LA2. A mobile performs a CLU in each of the traversed cells 1, 2 and 3. If a call attempt is made towards the mobile while the mobile is in cell 3, the only cells that will be paged are cell 1, cell 2, and cell 3.

Further, the CLU procedure can be performed by the mobile whenever it is turned on, or it moves into a new cell and starts listening to the new serving cell site. This new procedure requires a CLU message to be sent by the mobile to the serving cell site. In a typical wireless communication system, this message could be sent on a random access channel or on a dedicated signaling channel. The CLU message would be processed at the cell site, and an acknowledgment would be sent back to the mobile. Therefore, a typical mobile would require 2–4 messages to perform a cell-registration. As mentioned above in the discussion of step 315, the mobile will send a periodic cell-registration message if the mobile remains in the same cell for a period of time defined as CLU PERIOD ("CLUP"). Moreover, the mobile still performs the SLU when it moves to a different LA.

The corresponding cell-registration CLU algorithm for the mobile is:

IF the mobile has just camped on a new cell

THEN send a CLU message to the corresponding new cell site

ELSEIF CLUP has elapsed

THEN send a CLU message to the current camped-on cell site

ELSEIF the mobile was switched on

THEN send a CLU message to the current camped-on cell site

Unlike the SLU, the CLU is registered only with the serving cell site. The CLU message contains the mobile identification (ID). The serving cell site will register the mobile ID in a cell location update list. The CLU algorithm for the serving cell site is the following:

IF a CLU for a previously not-registered mobile is received

THEN {register the mobile in the cell location update list; Add a timestamp to the mobile registration record}

ELSEIF a CLU for a previously-registered mobile is received

THEN update the mobile registration record timestamp with the current time;

ELSEIF CLUP has elapsed

THEN {scan the cell location update list and purge any records which have a timestamp older than [Current Time−(CLUP+D)]}

Note the factor "D" is added to CLUP when deciding which records to purge to prevent border cases where a record is purged just before a page for the same mobile is received and before the periodic CLU request made it through. For example, D can be 10% of CLUP.

With reference to FIG. 3, it will be appreciated that CLUP corresponds to the "first time period" of step 315. Further, with reference to FIG. 4, it will be appreciated that (CLUP+D) corresponds to the "second time period" of step 407.

Moreover, in accordance with the present invention, rather than paging a mobile in all cells of a location area, the mobile is paged only in the cells it has visited in the most recent second time period, equal to (CLUP+D). These are the cells which the mobile camped-on during its traversal of the multiple-cell location area.

As mentioned above in the discussion of FIG. 3, the mobile 100 keeps track of its most recently-visited cells by maintaining (steps 309 and 313) a list of recently-visited cells, corresponding to element 201 in FIG. 2. This list of recently-visited cells 201 comprises the identities of the visited cells together with the corresponding times when the mobile performed the respective CLU registration procedures. One of the list entries represents the current cell where the mobile is camped on, and this entry is marked as such.

When a mobile camps on a new cell, it decodes the cell identity in the outbound control channel and then searches (step 309) for the cell's identity in the list of recently-visited cells. A CLU registration procedure will be performed (step 311) if the cell does not appear in the list. A corresponding entry, comprising the cell identity and registration time, will then be added to the list (step 313).

In addition to the above procedure for adding new registrations, the mobile periodically scans the list of recently-visited cells (such as, for example, at a scanning period of CLUP/2). As a result of the periodic scanning, if the mobile is stationary and remains in the same cell, then a new CLU registration will take place every CLUP time period (step 315), and the entry's registration time will be updated accordingly. Also, at each scan, the mobile deletes list entries with a registration time older than (current time−CLUP). This deletion is done since these registrations are no longer valid, as the corresponding cell sites have already discarded them (step 407).

When traveling along the boundary between cells, a mobile may repeatedly camp on the same cells multiple times. Each cell re-selection could trigger another CLU registration with the serving cell site, even though the mobile may still be registered in the cell. Such unnecessary multiple CLU registrations could place a substantial (and unneeded) load on the inbound control channel of the wireless communication system. By maintaining the list 201 as described above, the mobile is advantageously prevented from issuing the unneeded multiple CLU registrations that otherwise would occur when the mobile travels at the boundary between adjacent cells.

One advantage of the present invention is that it results in a 50%–70% REDUCTION in the air traffic being required for paging. As a further advantage, the invention also results in geographically expanded location areas which, in turn, results in up to a 40% REDUCTION in the number of switch location updates (SLU's) being required.

In summary, a wireless communication system includes switching infrastructure 150 and at least one location area ("LA") having a multiplicity of cells (the "multiple-cell LA") 103. When a mobile 100 enters a cell belonging to the multiple-cell LA, the mobile is arranged with a cell-registration feature that enables it to register with the serving cell site, thus forming a registration with the cell site. When the mobile enters a further cell belonging to the multiple-cell LA, the mobile registers with the corresponding further cell site, thus forming a registration with the further cell site. When the switching infrastructure receives a call attempt towards the mobile, the switching infrastructure pages the mobile in only those cells in which a cell registration exists for the mobile.

While various embodiments of the present invention have been described hereinabove, the scope of the invention is defined by the following claims.

What is claimed is:

1. A method for controlling a cell-registration feature of a mobile in a wireless communication system, the wireless communication system including switching infrastructure, the mobile including a call activity that varies with time, the method comprising the following steps, by the switching infrastructure:

monitoring call activity for a mobile that varies with time, determining the call activity for the mobile;

determining when the call activity for the mobile exceeds a first threshold; and, when it is determined that the call activity for the mobile exceeds the first threshold, enabling the cell-registration feature in the mobile.

2. The method of claim 1, including the following steps, by the switching infrastructure:

determining when the call activity for the mobile is less than a second threshold; and, when it is determined that the call activity for the mobile is less than the second threshold, disabling the cell-registration feature in the mobile.

3. The method of claim 2, wherein the first threshold is greater than the second threshold.

4. The method of claim 2, wherein the first threshold is approximately equal to the second threshold.

5. The method of claim 2, wherein the wireless communication system is a GSM system.

6. The method of claim 2, wherein the wireless communication system is an iDEN system.

7. The method of claim 2, wherein the wireless communication system is an USDC system.

* * * * *